United States Patent [19]
Schiering

[11] Patent Number: 6,098,776
[45] Date of Patent: Aug. 8, 2000

[54] REUSABLE AXLE ASSEMBLY AND A REPLACEABLE ROLLER SLEEVE FOR A CONVEYOR ROLLER

[76] Inventor: William C. Schiering, 225 Morgan Way, #43, Harrison, Ohio 45030

[21] Appl. No.: 09/040,955

[22] Filed: Mar. 18, 1998

Related U.S. Application Data

[60] Provisional application No. 60/039,338, Mar. 18, 1997.

[51] Int. Cl.[7] .................................................. B65G 13/00
[52] U.S. Cl. ............................................................. 193/37
[58] Field of Search ................................... 193/35 R, 37

[56] References Cited

U.S. PATENT DOCUMENTS

| | | | |
|---|---|---|---|
| 3,097,022 | 1/1961 | Senetz . | |
| 3,994,380 | 11/1976 | Hope et al. | 193/37 |
| 4,239,101 | 12/1980 | Krohmann et al. | 193/37 |
| 5,722,888 | 3/1998 | Lane | 193/37 X |

FOREIGN PATENT DOCUMENTS

| | | | |
|---|---|---|---|
| 36537071 | 5/1985 | Australia . | |
| 1187030 | 5/1985 | Canada . | |
| 3842905 | 6/1990 | Germany . | |
| 61511 | 5/1980 | Japan | 193/37 |
| 3-162306 | 7/1991 | Japan | 193/37 |

*Primary Examiner*—James R. Bidwell
*Attorney, Agent, or Firm*—Frost & Jacobs LLP

[57] ABSTRACT

A roller assembly for a roller conveyor with a replaceable roller sleeve is provided. An axle assembly with a locking piece that frictionally engages the underside of the roller sleeve allows replacement of the roller sleeve, without the need to replace the axle assembly.

20 Claims, 7 Drawing Sheets

REUSABLE AXLE ASSEMBLY AND A REPLACEABLE ROLLER SLEEVE FOR A CONVEYOR ROLLER

This is a non-provisional application based upon an earlier-filed Provisional application, Ser. No. 60/039,338, filed Mar. 18, 1997.

BACKGROUND OF THE INVENTION

The present invention pertains to a reusable axle assembly and replaceable roller sleeve for a conveyor roller. More particularly, it pertains to a reusable axle assembly with replaceable roller sleeves for use in conveyor rollers in such applications as coal mines and gravel pits.

Conveyor rollers used in heavy duty applications, such as coal mines and gravel pits, typically comprise an axle assembly that is welded to a roller sleeve. After a period of time, the roller sleeve becomes worn. However, the axle assembly is generally still usable. Because the roller sleeve is permanently attached to the axle assembly, the entire conveyor roller must be replaced.

The present invention provides a reusable axle assembly that can be easily detached from the roller sleeve after the useful life of the roller sleeve has been expended. A new roller sleeve is attached to the old axle assembly, thereby reducing the total cost of maintaining the conveyor. In this way, the more expensive mechanical components, such as bearings, hubs, and spindles, can continue to be used, while only the less costly roller sleeve is replaced.

SUMMARY OF THE INVENTION

The present invention provides a roller assembly for a roller conveyor comprising an axle assembly and a roller sleeve. The axle assembly further comprises two hub assemblies. Each hub assembly comprises a spindle with a first and second end. The spindle first end is inserted into at least one bearing race housed within a hub. An inner retainer disk is disposed about said hub, and an outer retainer disk is disposed about said hub. One of either the inner retainer disk or the outer retainer disk is movably disposed about the hub and the other is held stationary relative to the hub. The outer retainer disk is connected to said inner retainer disk so that the one of either the outer retainer disk or the inner retainer disk moves laterally along said hub relative to said other retainer disk. A locking piece is disposed about said hub between said inner retainer disk and said outer retainer disk. A roller sleeve slides over both hub assemblies and is held removably stationary relative to the hub assemblies by the locking piece.

The present invention further provides an axle assembly comprising two hub assemblies. Each hub assembly comprises a spindle with a first and second end. The spindle first end is inserted into at least one bearing race housed within a hub. An inner retainer disk is disposed about said hub, and an outer retainer disk is disposed about said hub. One of either the inner retainer disk or the outer retainer disk is movably disposed about the hub and the other is held stationary relative to the hub. The outer retainer disk is connected to said inner retainer disk so that one of the outer retainer disk or the inner retainer disk moves laterally along said hub relative to said other retainer disk. A locking piece is disposed about said hub between said inner retainer disk and said outer retainer disk.

The present invention also provides a method of assembling a roller assembly with a replaceable roller sleeve comprising the steps of providing an axle assembly having two hub assemblies each with a locking piece, sliding a roller sleeve onto said axle assembly, and removably attaching said roller sleeve onto each of said hub assemblies with said locking piece.

DETAILED DESCRIPTION OF THE PREFERRED EMBODIMENT

Figure 2:
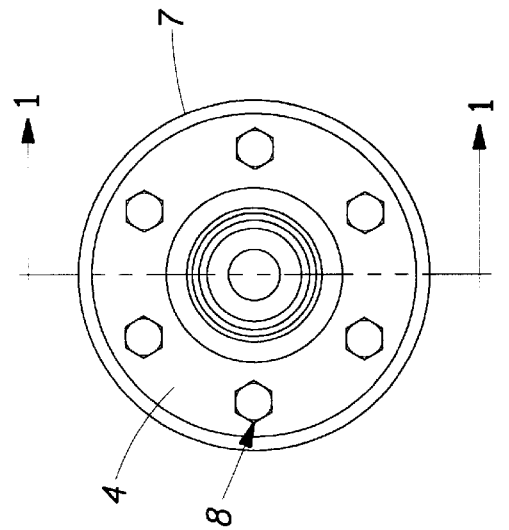
FIG. 2 is end elevational view of an embodiment of the roller assembly.
Figure 1:
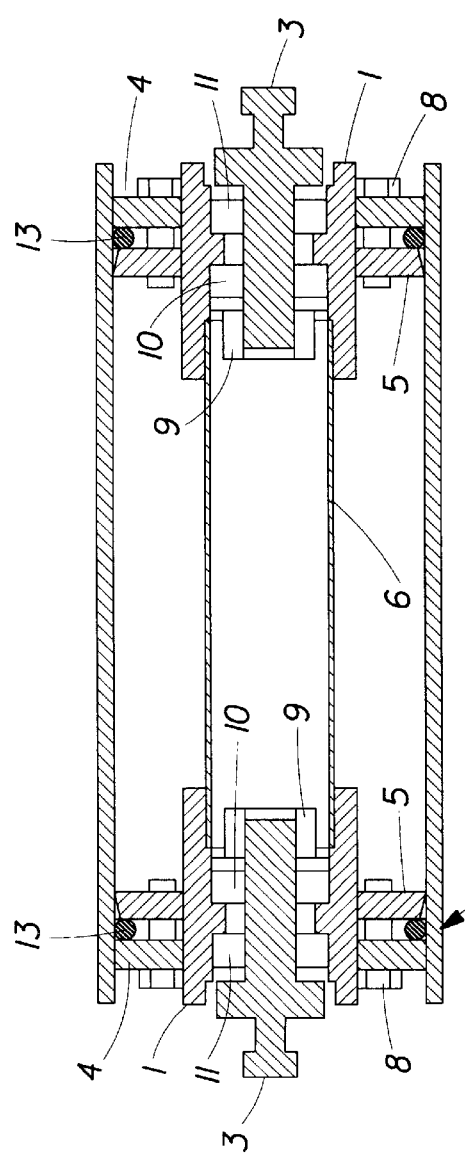
FIG. 1 is a sectional, side elevational view of an embodiment of the roller assembly taken along sectional line A—A of FIG. 2.

As shown in FIG. 1, the roller assembly 20 of the present invention comprises an axle assembly including two hub assemblies with locking pieces that removably lock a replaceable roller sleeve 7 onto the axle assembly.

The axle assembly may include a spacer 6. The spacer 6 can be a solid rod or a hollow tube. Preferably, the spacer 6 is a hollow tube. Preferably, the spacer 6 is an extruded tube. The spacer 6 holds and locates the hub assemblies. It also provides stability to the axle assembly so that when weight is applied to the roller sleeve 7, the hub assemblies maintain a position parallel to the travel of the load across the conveyor. The length of the spacer 6 is controlled by the overall width of the roller assembly 20.

The spacer 6 can be made of any material strong enough to provide stability to the roller. For example, it can be made of carbon steel, stainless steel or aluminum. Preferably, it is made of carbon steel. The outside diameter of the tube must be smaller than the overall diameter of the roller sleeve 7. Preferably the spacer 6 is sized so that it fits inside the hub.

If the axle assembly includes a spacer, two hub assemblies are attached to the spacer 6, one at each end of the spacer 6. The hub assemblies allow for mounting the roller assembly 20 into a conveyor frame (not shown). If the axle assembly does not include a spacer, the two hub assemblies are located at either end of the roller sleeve. Preferably, the axle assembly includes a spacer. The hub assemblies also include a locking piece 13 that removably locks the axle assembly to the replaceable roller sleeve 7.

Figure 11:
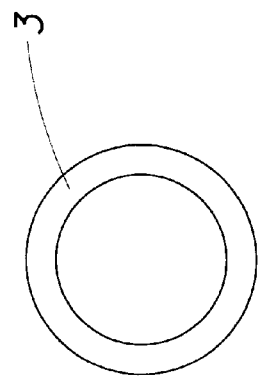
FIG. 11 is a end elevational view of the spindle.
Figure 10:
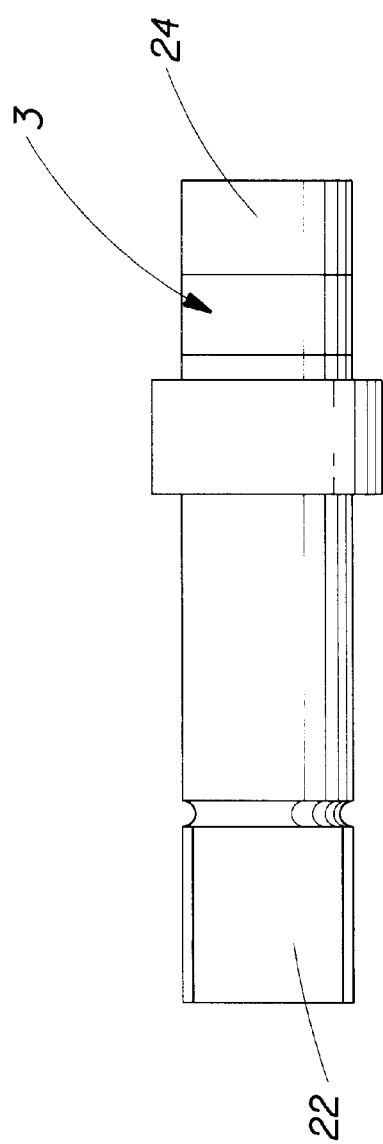
FIG. 10 is a side elevational view of a spindle.

Each hub assembly comprises a spindle 3, a hub 1 and retainer disks 4 and 5. Spindles 3 are well known in the art. The spindle 3 can be any configuration known in the art. The spindle 3 has a first end 22 and second end 24. See FIGS. 10 and 11. The first end 22 is inserted into the hub 1. See FIG. 1. The spindle first end 22 is inserted through at least one bearing race 10, and preferably two bearing races. The bearing race(s) 10 include bearings 11 that allow the roller sleeve 7 to rotate about the spindle 3, which stays stationary relative to the conveyor frame. Any bearings known in the art can be used, including, for example, tapered roller bearings, or sealed ball bearings. Preferably, the race(s) 10 include sealed ball bearings. The bearing race(s) 10 are held in position about the spindle 3 by the hub 1. The first end of the spindle 3 preferably locks into the spacer 6. Preferably, the spindle 3 has an undercut at its second end 24, which interlocks in a conveyor frame (not shown).

Figure 14:
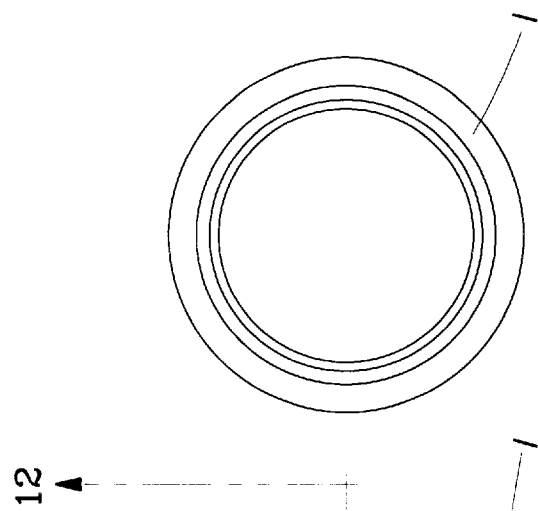
FIG. 14 is an end elevational view of the hub.
Figure 13:
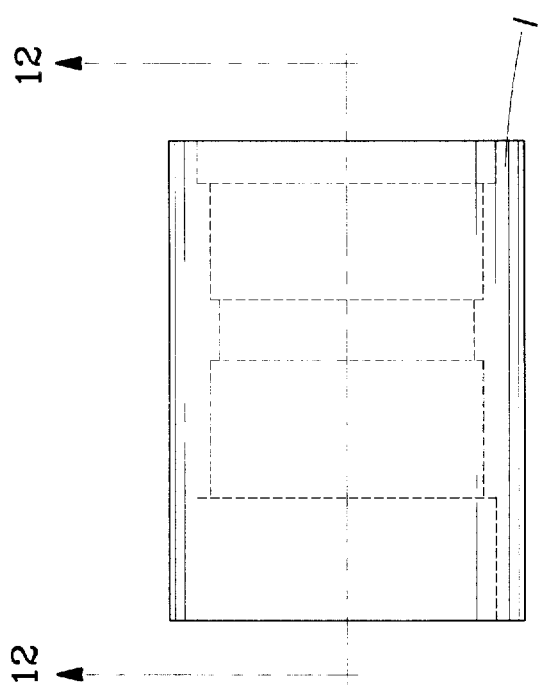
FIG. 13 is a side elevational view of the hub.
Figure 12:
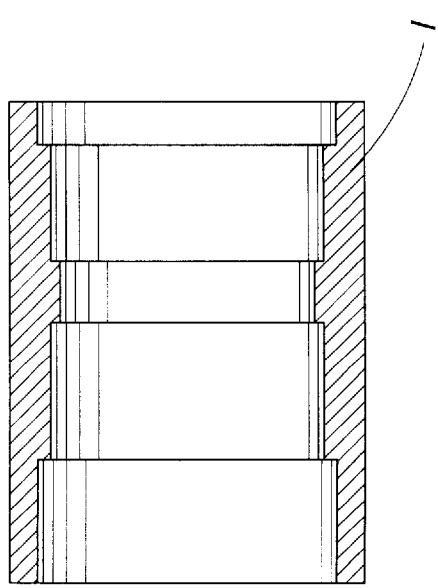
FIG. 12 is cross-sectional, side elevational view of a hub taken along section line A—A of FIG. 13.

As shown in FIGS. 12–14, the hub 1 is a generally cylindrical piece. Each hub 1 is attached to an end of the spacer 6, if one is included in the axle assembly. The outer diameter of the hub 1 must be smaller than the inner diameter of the roller sleeve 7. Preferably, each hub 1 is sized so as to fit over each end of the spacer 6.

Figure 6:
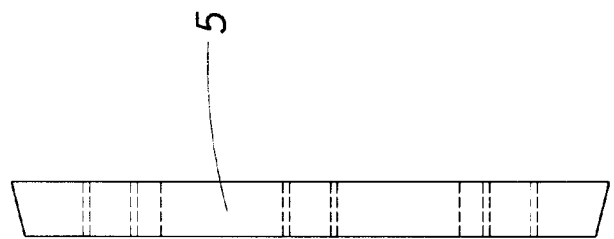
FIG. 6 is a side elevational view of an inner retainer disk.
Figure 5:
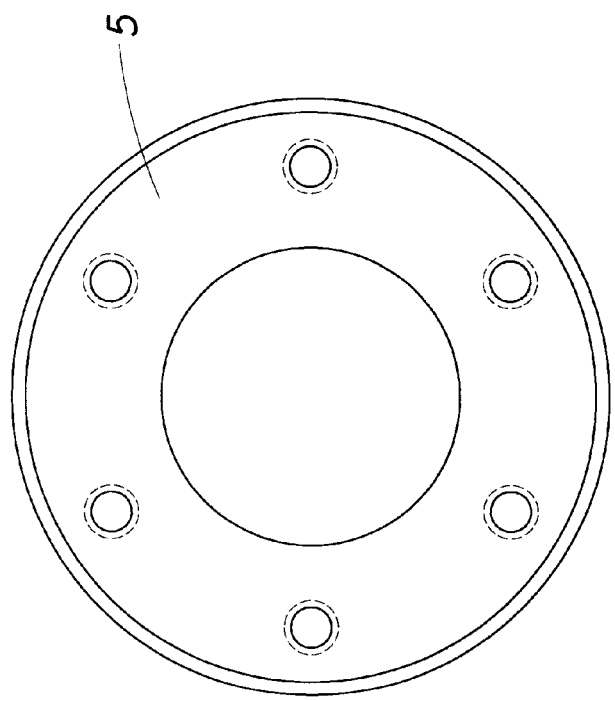
FIG. 5 is a end elevational view of an inner retainer disk.
Figure 8:
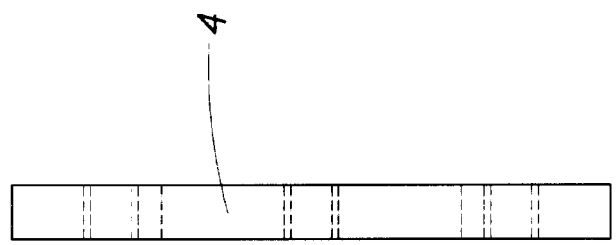
FIG. 8 is a side elevational view of an outer retainer disk.
Figure 7:
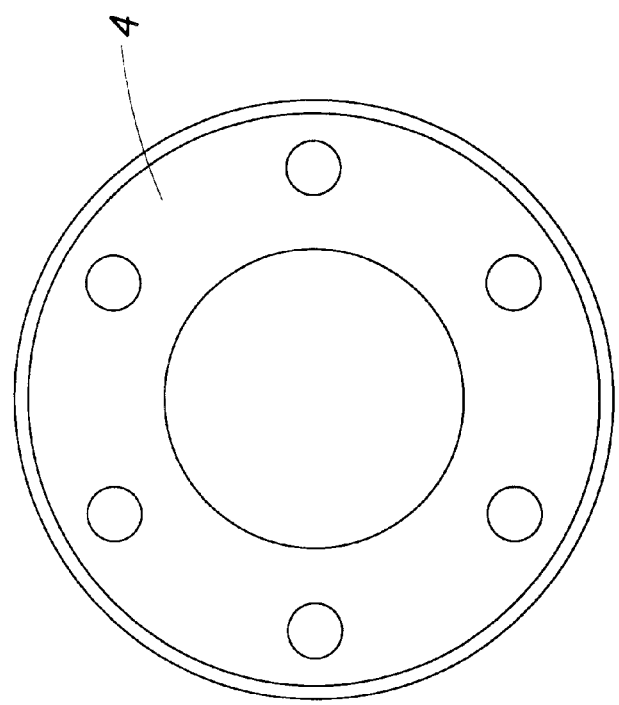
FIG. 7 is a front elevational view of an outer retainer disk.

As FIGS. 5 and 6 indicate, an inner retainer disk 5 and an outer retainer disk 4 is positioned about the outer diameter of the hub 1. Either the inner retainer disk 5 or the outer retainer disk 4 are attached to the hub 1 so that it is held stationary relative to the hub 1. Whichever retainer disk, 4 or 5, that is held stationary can be a separate piece attached to the hub 1 or it can be an integral part of the hub 1. For example, the hub 1 and outer retainer disk 4 can be cast as one piece, or the outer retainer disk 4 can be welded to the hub 1. Whichever retainer disk 4 or 5 that is not held stationary relative to the hub also fits over the outer diameter of the hub assembly and is mounted so that it can move laterally relative to the hub 1. The inner retainer disk 5 and the outer retainer disk 4 are connected to each other so that the one retainer disk 4 or 5 can be moved laterally along the hub 1 relative to the other retainer disk 4 or 5. Preferably, the outer retainer disk 4 is held stationary relative to the hub 1 and the inner retainer disk 5 moves laterally along the hub 1.

The hub 1, the spindle 3 and the inner and outer retainer disks 4 and 5 can be made of any appropriate materials known in the art. The material must be able to withstand the operating environment and, particularly in the case of the spindle 3 and hub 1, have sufficient structural integrity to support the weight of loads being carried by the conveyor. Preferably, they are made of carbon steel, stainless steel and/or aluminum. These pieces can all be made of the same material or they each can be made of a different material. The inner and outer retainer disks 4 and 5 are sized so that their outer diameter is slightly less than the inner diameter of the roller sleeve 7. The inner diameter of the inner and outer retainer disks 4 and 5 should be sized to be slightly larger than that of the outer diameter of the hub 1.

Figure 9:
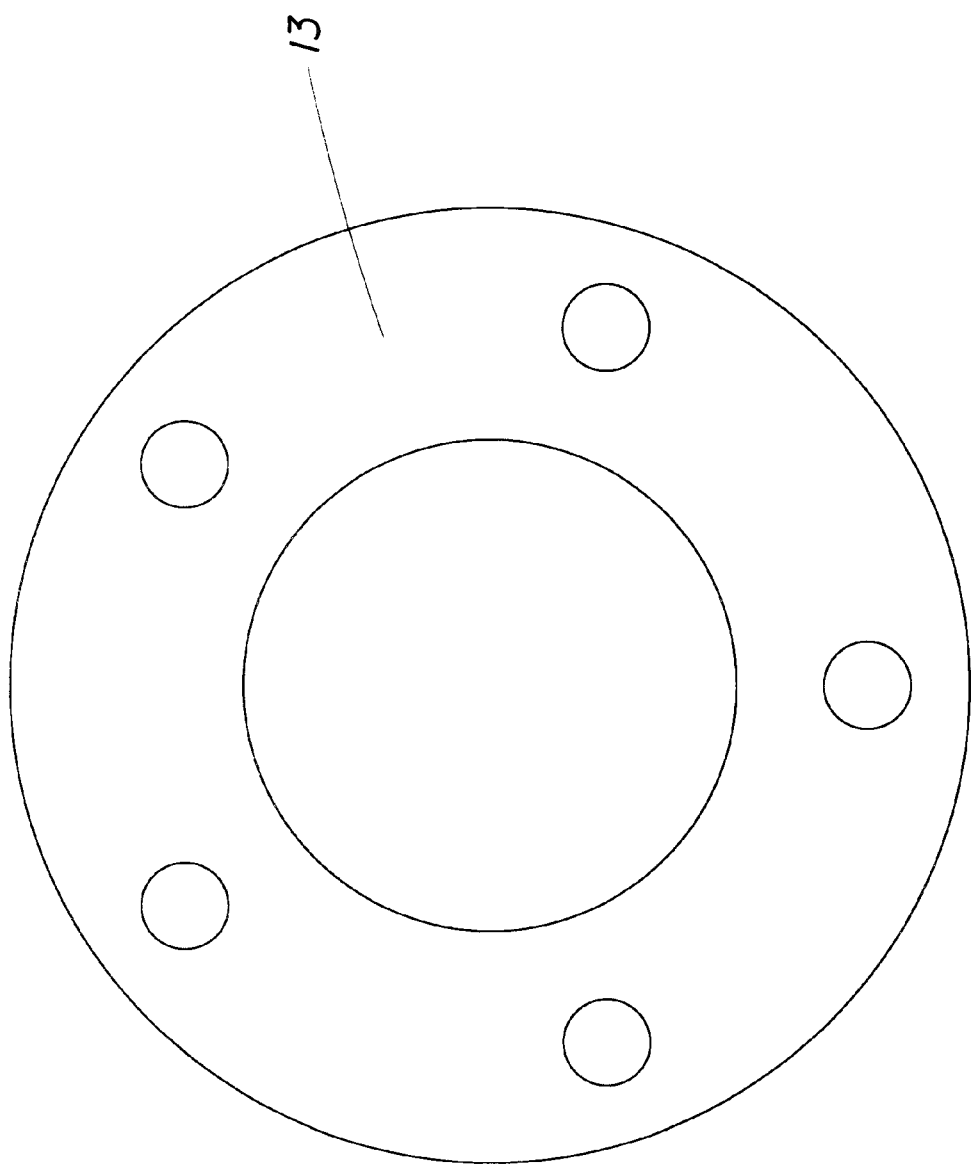
FIG. 9 is a front elevational view of a locking piece.

Between the inner and outer retainer disks 4 and 5 is a locking piece 13, shown in FIGS. 1 and 9. This locking piece 13 is configured so that when the movable retainer disk 4 or 5 is moved laterally closer to the stationary retaining disk, the locking piece 13 is pushed into contact with the inner surface of the roller sleeve 7. The locking piece 13 can be made from any material that will move into frictional contact with the inner diameter of the roller sleeve 7.

Preferably, the locking piece is made from an elastomeric material. More preferably, it is rubber. Most preferably, it is neoprene rubber. If the locking piece 13 is an elastomeric material, it should have a durometer such that the material will expand upon compression against the inner surface of the roller sleeve 7. Preferably, the elastomeric material has a durometer of approximately 60 to approximately 80. More preferably, it has a durometer of approximately 60. The locking piece 13 can be a washer shaped piece with an inner diameter slightly larger than that of the hub 1 and an outer diameter of approximately the same size as that of the inner and outer retainer disks 4 and 5. See FIG. 9. The locking piece 13 can also be an o-ring disposed between the inner and outer retainer disks 4 and 5. See FIG. 1. Preferably, the locking piece 13 is a rubber washer. More preferably, it is a rubber washer with holes in it so that bolts between the inner retainer disk 5 and the outer retainer disk 4 can be tightened. As the bolts are tightened, the rubber washer expands into frictional contact with the inner surface of the roller sleeve 7. If an o-ring is used, the outer perimeter of either the outer retainer disk 4 or the inner retainer disk 5 may be configured so as to facilitate placement of the o-ring. For example, the outer perimeter of the inner retainer disk 5 may have an angled perimeter.

In another embodiment of the present invention, the locking piece 13 comprises at least one wedge disposed between the inner retainer disk 5 and the outer retainer disk 4 such that, as the outer retainer disk 4 is moved closer to the inner retainer disk 5, the wedge moves into contact with the inner surface of the roller sleeve 7. Preferably, there is more than one wedge disposed about the circumference of the circle formed between the inner retainer disk 5 and outer retainer disk 4. More preferably, the locking piece 13 comprises a plurality of wedges. The wedges can be made of materials such as stainless steel, carbon steel, or aluminum. The end of the wedge that contacts the inner surface of the roller sleeve 7 may be coated. For example, it may be coated with a polymeric material, such as rubber or polyurethane.

Figure 3:
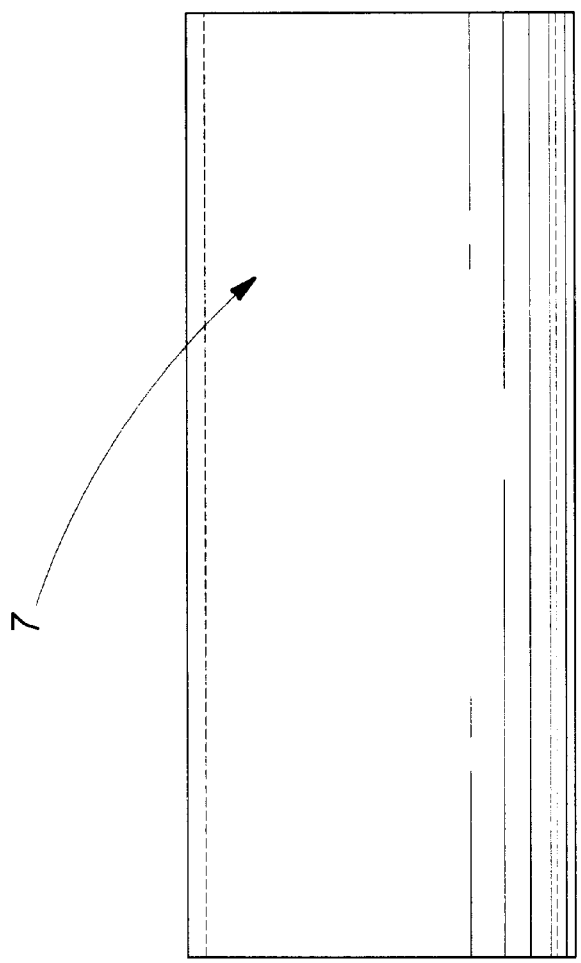
FIG. 3 is a top plan view of a roller sleeve.
Figure 4:
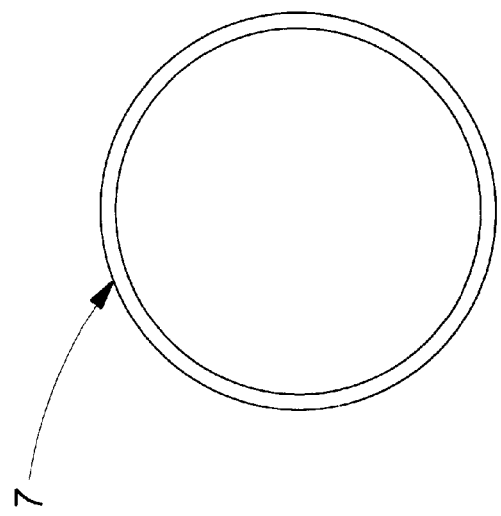
FIG. 4 is an end elevational view of the roller sleeve.

A replaceable roller sleeve 7 slides over the two hub assemblies. See FIGS. 1, 3 and 4. The replaceable roller sleeve 7 is a hollow tube made of any material that will withstand the environment in which it is being used. Preferably, the roller sleeve 7 is made of carbon steel, stainless steel or aluminum. The outer surface of the roller sleeves 7 may also be coated. Suitable coatings include, but are not limited to, polymeric coatings, urethane, rubber, paint, or flame spray coating. More than one coating may be applied to the roller sleeve 7.

As FIG. 1 shows, to assemble the roller assembly 20 of the present invention, two hub assemblies are attached at either end of a spacer 6, and a roller sleeve 7 is slid over the two hub assemblies after the sleeve is centered over the two hub assemblies. Means for moving the locking piece 13, such as bolts between the inner and outer retainer disks 4 and 5, are tightened. As the movable retainer disk 4 or 5 is moved closer to the stationary retainer disk 4 or 5, the locking piece 13 moves into frictional contact with the underside of the roller sleeve 7, thereby locking the roller sleeve 7 into place. After the roller sleeve 7 has been in use for a period of time and needs to be replaced, the bolts are released. This releases the locking piece 13 from contact with the roller sleeve 7. The roller sleeve 7 is removed, and a new roller sleeve 7 is put in place on the same axle assembly. The bolts are tightened, the locking piece 13 locks the new roller sleeve 7 into position and the roller assembly 20 is ready to be placed back into operation. In this way, roller sleeves 7 can be replaced without the necessity of replacing the more expensive axle assembly.

Any axle assemblies known in the art can be used with the present invention. It is important that such axle assemblies have locking pieces 13 that will lock a roller sleeve 7 onto the axle assembly with frictional forces thereby allowing the easy replacement of a roller sleeve 7. Because the roller sleeve 7 can be easily replaced, the invention also allows the roller sleeve 7 to be made of a less expensive and/or less durable material than the axle assembly.

Roller assemblies of the present invention can be made in any diameter used in the art. Preferably, such roller assemblies have an outer diameter up to approximately 10". The roller assemblies of the present invention can be any length. Preferably, they are between about 10" to about 96" in length.

What is claimed is:

1. A roller assembly for a roller conveyor comprising:
   an axle assembly further comprising:
   a. two hub assemblies, each hub assembly further comprising:
      i. a spindle with a first and second end,
      ii. said spindle first end inserted into at least one bearing race housed within a hub,
      iii. a first retainer disk disposed about said hub,
      iv. an second retainer disk removably disposed about said hub and connected to said first retainer disk, so that the second retainer disk can move laterally along said hub relative to said first retainer disk, and
      v. a locking piece disposed about said hub between said first retainer disk and said second retainer disk, and
   a roller sleeve, wherein said roller sleeve slides over both hub assemblies and is held removably stationary relative to the hub assemblies by the locking piece.

2. A roller assembly in accordance with claim 1 wherein the axle assembly further comprises a spacer with a first end and a second end, wherein a hub assembly is attached to each end of said spacer.

3. A roller assembly in accordance with claim 1 wherein said first retainer disk is an outer retainer disk and said second retainer disk is an inner retainer disk.

4. A roller assembly in accordance with claim 1 wherein each hub assembly further comprises a second bearing race housed within the hub assembly, with said spindle first end inserted through the second bearing race.

5. A roller assembly in accordance with claim 1 wherein said inner retainer disk is welded to said hub.

6. A roller assembly in accordance with claim 1 wherein said inner retainer disk is an integral part of the hub.

7. A roller assembly in accordance with claim 1 wherein said outer retainer disk and said inner retainer disk are attached to each other by a plurality of bolts.

8. A roller assembly in accordance with claim 1 wherein said locking piece is made of an elastomeric material.

9. A roller assembly in accordance with claim 8 wherein said locking piece is an o-ring.

10. A roller assembly in accordance with claim 8 wherein said locking piece is a washer shaped piece.

11. A roller assembly in accordance with claim 1 wherein said locking piece comprises at least one wedge.

12. An axle assembly comprising two hub assemblies, each hub assembly further comprising:
   i. a spindle with a first and second end,
   ii. said spindle first end inserted into at least one bearing race housed within a hub,
   iii. an inner retainer disk disposed about said hub,
   iv. an outer retainer disk removably disposed about said hub and connected to said inner retainer disk, so that the outer retainer disk can move laterally along said hub relative to said inner retainer disk, and
   v. a locking piece disposed about said hub between said inner retainer disk and said outer retainer disk.

13. An axle assembly in accordance with claim 12 further comprising a spacer with a first end and a second end, wherein a hub assembly is attached to each end of said spacer.

14. An axle assembly in accordance with claim 12 wherein said locking piece is made of an elastomeric material.

15. An axle assembly in accordance with claim 14 wherein said locking piece is an o-ring.

16. An axle assembly in accordance with claim 14 wherein said locking piece is a washer shaped piece.

17. An axle assembly in accordance with claim 12 wherein said locking piece comprises at least one wedge.

18. A method of assembling a roller assembly comprising the steps of:
   a. providing an axle assembly having two hub assemblies, each hub assembly having a locking piece disposed between a first retainer disk and a second retainer disk,
   b. sliding a roller sleeve onto said axle assembly, and
   c. removably attaching said roller sleeve onto each of said hub assemblies with said locking piece.

19. A method in accordance with claim 18 wherein said locking piece is made of an elastomeric material.

20. A method in accordance with claim 18 wherein said locking piece comprises at least one wedge.

* * * * *